Patented Apr. 15, 1930

1,754,886

UNITED STATES PATENT OFFICE

WILLIAM C. GEER, OF NEW ROCHELLE, NEW YORK, AND HARLAN L. TRUMBULL, OF HUDSON, OHIO, ASSIGNORS TO THE B. F. GOODRICH COMPANY, OF NEW YORK, N. Y., A CORPORATION OF NEW YORK

DISPERSED VULCANIZED RUBBER

No Drawing. Application filed June 13, 1925, Serial No. 36,940. Renewed September 15, 1928.

This invention relates to the utilization of vulcanized rubber scrap, such as factory waste, old tire-casings and inner tubes, and other worn-out rubber articles, and it has for an object to provide a method for comminuting soft-vulcanized rubber in an aqueous medium to a very fine state of subdivision and, if desired, thereafter recovering the dispersoid from the suspending liquid for use as a compounding ingredient in a vulcanizable rubber composition. A further object of our invention is to provide the novel composition of matter ensuing from the above noted process.

It has heretofore been the practice to pulverize hard vulcanized rubber by attrition in an inert gaseous medium, but, in so far as we are aware, no practical means have been devised for finely grinding the softer grades of vulcanized rubber. The procedure of the present application is especially designed for the comminution of soft-vulcanized rubbers but may be applied to the grinding of semi-hard or even hard rubber scraps with but slight modification.

We have discovered, and have demonstrated the practicability of the process by actual operation, that it is possible by mechanical grinding to disperse vulcanized rubber in an aqueous medium to a very fine state of subdivision, the grinding preferably taking place in the presence of a suitable emulsifying agent in a so-called colloidal mill. The dispersoid so produced can be recovered by removal of the liquids, and employed as a compounding ingredient in a vulcanizable rubber composition.

*Example I.*—In carrying out one embodiment of our invention, soft vulcanized rubber, such as water bag scrap, is soaked with kerosene, gasoline or other rubber solvent until it increases about 30 per cent in weight. 500 parts by weight of this product is then ground on a tight rubber mill and subsequently worked into an emulsifying paste, for example, one consisting of casein, 50 parts, sodium carbonate 5 parts, artificial latex paste (⅔ plantation A rubber) 95 parts, water 300 parts, ammonium hydroxide being added in small amounts during the forming of the paste. The artificial latex described in the Patent No. 1,513,139 may be used, if desired.

This admixture or paste of emulsifying agent and scrap rubber is diluted with an equal volume of water and the resulting creamy liquid is passed through a suitable colloidal mill, as for example, a modified, high-speed De Laval emulsor, having rotor and stator cones adjustable to 0.001 inch clearance, starting with clearances of 0.030 inch and working down in about ten steps to 0.003 inch. There results a very fine subdivision of the scrap rubber in the emulsion, the particle size approaching that of a latex globule, as shown by microscopic comparison. Upon standing, the emulsion gradually loses a white, finely divided pigment, principally zinc oxide, and upon evaporating to dryness a thin layer of white oxide remains on the surface of dried solids.

*Example II.*—As a further example, 1000 parts of heavily pigmented, soft-vulcanized rubber, such as cord tire casing tread, is impregnated by the addition thereto of 1000 parts of high test gasoline. The impregnated rubber is ground on a tight rubber mill and an aqueous paste containing 200 parts of casein and 20 parts of sodium carbonate is worked into it while on the rubber mill. The emulsion of paste and scrap rubber is then diluted with one or more volumes of water to form a non-viscous, creamy liquid carrying suspended scrap particles, and fed through a colloidal mill, such as a De Laval emulsor, having rotor and stator cones carrying grooves 50 to the inch set at a cutting angle of 30 degrees, starting with a clearance of 0.050 inch and working down by stages to 0.005 inch.

A drop of the resulting emulsion examined under a microscope shows finely dispersed particles both of vulcanized rubber and pigment in Brownian movement. Comparison at 383 diameters shows these dispersed particles to be nearly identical in size with rubber latex particles or globules. The above dispersion is coagulated by a saturated solution of potassium alum, but is not coagulated by acetic or dilute hydrochloric acids. A mixture of acetic acid and zinc sulfate, however, coagulates the dispersion to which some latex has been added. When the dispersion medium is acid, the evolution of hydrogen sulfide from the reaction with sulfides is sufficient to give slow bubbling.

The above dispersion, when evaporated to dryness, may be employed in compounding into various rubber compositions. We have found that the physical properties of a standard vulcanized rubber composition, to which 20 parts by weight of the soft rubber dispersoid has been added, are comparable to those of the same standard composition to which an equivalent addition of high grade tire reclaim has been made.

By modifying the preliminary steps of the above indicated processes to effect a chopping up of the vulcanized rubber into relatively small pieces either prior or subsequent to impregnation with gasoline, or other rubber solvent, whole tires and other fabric containing scrap rubbers may be treated in the manner hereinabove set forth to produce compounding substances. Semi-hard rubber and hard rubber may likewise be broken down, mixed with an emulsifying agent and reduced to small particle size in a colloidal mill of the character hereinabove described.

It is obvious that numerous variations and modifications in the above described process may be made without departing from the principles of this invention, and we therefore do not purpose wholly to limit the claims to the specific methods herein set forth.

We claim:

1. The herein described process which comprises plasticizing vulcanized rubber with the aid of a rubber softener, intimately admixing with the plasticized rubber a colloidal emulsifying paste to form a relatively smooth paste-like mass, adding a non-solvent liquid to the mass to form a non-viscous creamy liquid, and subjecting the creamy liquid to a comminuting action to reduce the size of the suspended particles to approximately that of rubber latex.

2. The herein described process which comprises plasticizing vulcanized rubber with the aid of a rubber softener, and intimately admixing with the plasticized rubber a colloidal emulsifying paste containing casein to form a relatively smooth paste-like mass, adding a non-solvent liquid to the mass to form a non-viscous creamy liquid, and subjecting the creamy liquid to a comminuting action to reduce the size of the suspended particles to approximately that of rubber latex.

3. The herein described process which comprises plasticizing vulcanized rubber with the aid of a rubber softener, intimately admixing with the plasticized rubber a colloidal emulsifying paste containing casein and sodium carbonate to form a relatively smooth paste-like mass, adding a non-solvent liquid to the mass to form a non-viscous creamy liquid, and subjecting the creamy liquid to a comminuting action to reduce the size of the suspended particles to approximately that of rubber latex.

4. The herein described process which comprises plasticizing vulcanized rubber with the aid of a rubber softener, intimately admixing with the plasticized rubber a colloidal emulsifying paste containing a latex paste to form a relatively smooth paste-like mass, adding a non-solvent liquid to the mass to form a non-viscous creamy liquid, and subjecting the creamy liquid to a comminuting action to reduce the size of the suspended particles to approximately that of rubber latex.

5. The herein described process which comprises plasticizing vulcanized rubber with the aid of a rubber softener, intimately admixing with the plasticized rubber a colloidal emulsifying paste containing casein and a latex paste to form a relatively smooth paste-like mass, adding a non-solvent liquid to the mass to form a non-viscous creamy liquid, and subjecting the creamy liquid to a comminuting action to reduce the size of the suspended particles to approximately that of rubber latex.

6. The herein described process which comprises forming a paste containing a hydrophilic colloidal substance and an emulsifying reagent, plasticizing a soft vulcanized rubber with the aid of a rubber softener, intimately admixing the paste and the plasticized rubber to form a relatively smooth paste-like mass, diluting with water the paste-like mass to form a non-viscous, creamy liquid, and subjecting the creamy liquid to a mechanical grinding action to reduce the size of the suspended particles to approximately that of rubber latex.

7. The herein described process which comprises forming a paste containing a hydrophilic colloidal substance and an emulsifying reagent, plasticizing a soft vulcanized rubber with the aid of a rubber softener, intimately admixing the paste and the plasticized rubber to form a relatively smooth paste-like mass, diluting with water the paste-like mass to form a non-viscous, creamy liquid, subjecting the creamy liquid to a mechanical grinding action to reduce the size of the suspended particles to approximately that of rubber latex, and removing substantially all liquids from the resulting suspension.

8. The herein described process which comprises forming a paste containing a hydrophilic colloidal substance and an emulsifying reagent, plasticizing a soft vulcanized rubber with the aid of a rubber softener, intimately admixing the paste and the plasticized rubber to form a relatively smooth paste-like mass, diluting with water the paste-like mass to form a non-viscous, creamy liquid, subjecting the creamy liquid to a mechanical grinding action to reduce the size of the suspended particles to approximately that of rubber latex, and evaporating the liquids from the resulting suspension.

9. The herein described process which comprises absorbing in a soft vulcanized rubber a rubber solvent, masticating the rubber to form a plastic mass, adding to the rubber during mastication a colloidal emulsifying paste, and continuing the mastication of the admixture until a relatively smooth paste-like mass is formed.

10. The herein described process which comprises absorbing in a soft vulcanized rubber a rubber solvent, masticating the rubber to form a plastic mass, adding to the rubber during mastication a colloidal emulsifying paste, continuing the mastication of the admixture until a relatively smooth paste-like mass is formed, and diluting with water the paste-like mass to form a non-viscous, creamy liquid.

11. The herein described process which comprises absorbing in a soft vulcanized rubber a rubber solvent, masticating the rubber to form a plastic mass, adding to the rubber during mastication a colloidal emulsifying paste, continuing the mastication of the admixture until a relatively smooth paste-like mass is formed, diluting with water the paste-like mass to form a non-viscous, creamy liquid, and subjecting the creamy liquid to a mechanical grinding action to reduce the size of the suspended particles to approximately that of rubber latex.

12. The herein described process which comprises absorbing in a soft vulcanized rubber a rubber solvent, masticating the rubber to form a plastic mass, adding to the rubber a paste containing a hydrophilic colloid and an emulsifying agent, and continuing the mastication of the admixture until a relatively smooth paste-like mass is formed.

13. The herein described process which comprises absorbing in a soft vulcanized rubber a rubber solvent, masticating the rubber to form a plastic mass, adding to the rubber a paste containing a hydrophilic colloid and an emulsifying agent, continuing the mastication of the admixture until a relatively smooth paste-like mass is formed, and diluting with water the paste-like mass to form a non-viscous, creamy liquid.

14. The herein described process which comprises absorbing in a soft vulcanized rubber a rubber solvent, masticating the rubber to form a plastic mass, adding to the rubber a paste containing a hydrophilic colloid and an emulsifying agent, continuing the mastication of the admixture until a relatively smooth paste-like mass is formed, diluting with water the paste-like mass to form a non-viscous, creamy liquid, and subjecting the creamy liquid to a mechanical grinding action to reduce the size of the suspended particles to approximately that of rubber latex.

In witness whereof we have hereunto set our hands this 28th day of May, 1925.

WILLIAM C. GEER.
HARLAN L. TRUMBULL.